Patented May 20, 1941

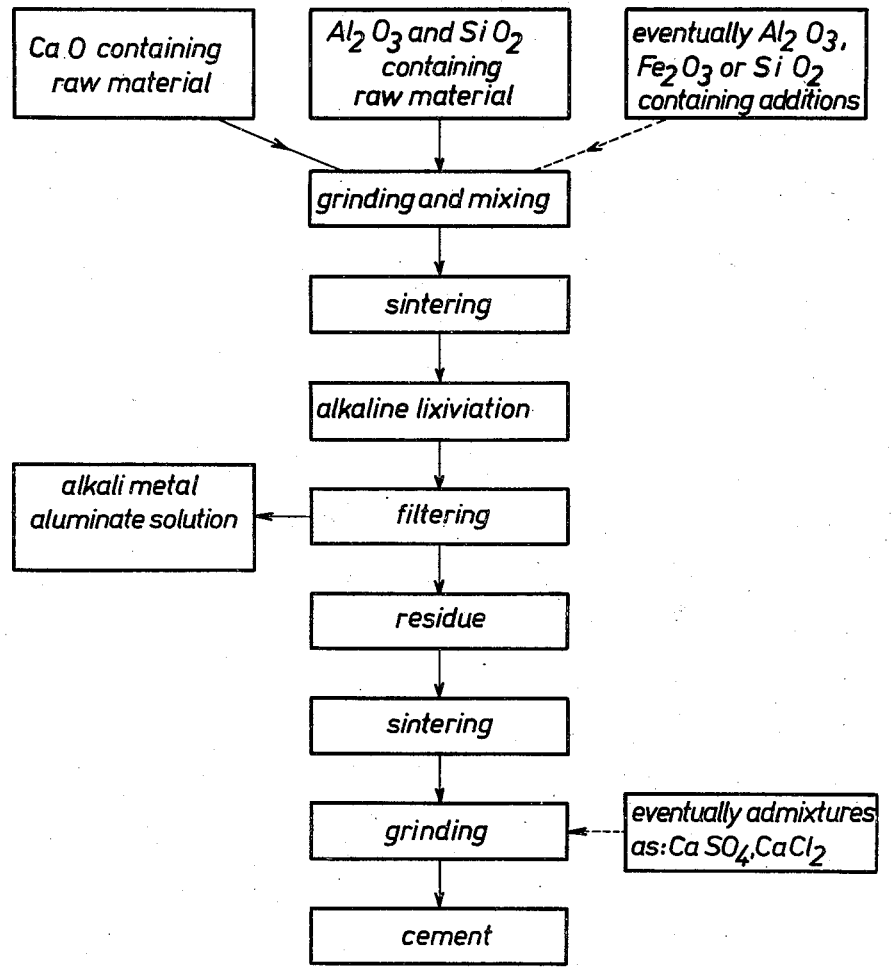

2,242,258

UNITED STATES PATENT OFFICE 2,242,258

MANUFACTURE OF CEMENT AND ALKALI METAL ALUMINATE

Walter Noll, Cologne-Mulheim, Germany, assignor to I. G. Farbenindustrie Aktiengesellschaft, Frankfort-on-the-Main, Germany Application January 12, 1939, Serial No. 250,573
In Germany January 20, 1938

11 Claims. (Cl. 106—25)

This invention relates to improvements in the manufacture of cement and alkali metal aluminate from materials containing aluminium oxide and silicic acid.

When manufacturing alumina from bauxite by decomposition with alkaline reacting compounds there are obtained residues, representing a useful by-product, while when preparing alumina from raw materials containing aluminium oxide and a large amount of silicic acid there are obtained residues, consisting mainly of silicic acid, which are practically worthless. This affects the economy of those processes by which alumina is to be manufactured from raw materials rich in silicic acid, the more so since the aluminum silicates generally are poorer in alumina than the bauxites. The problem of economy in the manufacture of alumina from raw materials rich in silicic acid is therefore at the same time the important problem of utilizing the residues obtained during the decomposition. These residues can be used in a useful way by supplying them to cement-works. Thus the residual silicic acid obtained in the decomposition by means of an acid is already used for the manufacture of cement. More suitable are those residues which are obtained by the alkaline decomposition of raw materials containing aluminium oxide and silicic acid, which residues are obtained either by means of sodium carbonate and calcium carbonate or by means of calcium carbonate only, since they contain lime besides the silicic acid. It has also been suggested to sell these residues as lime for the improvement of agricultural land.

In all these cases the residue is practically without value, since it can be used in the different industries only as a sort of additional agent. For instance, for the manufacture of cement it first must be dried, analyzed, and then must be mixed with other raw materials and ground to a cement starting mixture.

In accordance with the present invention I have found that cement on the one hand and alkali metal aluminate on the other hand are obtained in a simple way and in only a few working steps from raw materials containing aluminium oxide and silicic acid by mixing a material containing aluminium oxide and silicon dioxide in a proporton of 1 mol of $Al_2O_3$ to obout 0.6-6, preferably 1-4, mols of $SiO_2$ with a calcium compound yielding calcium oxide during calcination, whereby the mixture to be calcined is composed in such a proportion that there are present 1.8-2.2 mols of CaO to 1 mol of $Al_2O_3$ and in addition 1.8-2.2 mols of CaO to 1 mol of $SiO_2$, heating the mixture to sintering temperature, lixiviating the calcined product by means of an aqueous solution of an alkali metal salt which yields by double decomposition a difficultly soluble calcium compound, separating the alkali metal aluminate solution obtained from the solid residue, washing the residue with water, heating the washed solid residue to sintering temperature and grinding to cement fineness. In most cases the raw materials contain smaller or larger amounts of iron compounds, especially $Fe_2O_3$. Hereby the content of iron oxide in the mixture of the raw materials shall be at the most 0.3 mol of $Fe_2O_3$ to 1 mol of $SiO_2$ and for each mol of $Fe_2O_3$ in addition 1.8-2.2 mols of CaO are to be calculated.

A flow sheet of the process of the present invention is shown in the accompanying drawing.

The working method more particularly is as follows: The raw material or materials are finely ground and mixed with a calcium-compound equally finely ground, for instance with limestone. The degree of fineness of grinding should be such that the residue left on a 4900 mesh per $cm^2$ sieve is less than 25%. The proportion of the mixture is as follows: 1 mol of $Al_2O_3$ to 1.8-2.2 mols of CaO, 1 mol of $SiO_2$ to 1.8-2.2 mols of $CaO_2$, 1 mol of $Fe_2O_3$ to 1.8-2.2 mols of CaO, 0.6-6, preferably 1-4, mols of $SiO_2$ to 1 mol of $Al_2O_3$ and 1 mol of $SiO_2$ to a trace up to 0.3 mol of $Fe_2O_3$. If by the combination of the aluminium silicate and the calcium-compound there does not result such a mixture, the missing ingredients are to be added, if desired in the form of raw materials, rich in silicic acid, as for instance quartz sand, flint or raw materials rich in alumina, as for instance bauxite or laterite; or raw materials, rich in iron, as for instance limonite, roasted pyrites etc. Thereupon this mixture is sintered in an appropriate apparatus, for instance a rotary kiln, preferably after having been granulated. The temperatures required for the sintering process are between about 1200 and about 1500° C. and depend in particular upon the composition of the raw materials, especially upon the content of fluxing materials such as alkalies, iron oxide, magnesium compounds etc. The sintered product obtained tends to disintegrate spontaneously into a fine powder when exposed to the air. In most cases grinding is superfluous, whereby considerable expense is saved considering that the calcined material generally is very hard.

The powder, obtained by disintegration of the clinker or when necessary by grinding it thereupon lixiviated with the solution of an alkali metal salt, the acid radical of which forms together with the calcium of the clinker a difficultly soluble compound, as for instance sodium carbonate or sulfate or oxalate. Sodium carbonate is preferably used for this purpose. By treatment with this solution a smaller or larger amount of the alumina is dissolved in form of alkali metal aluminate. The amount of the dissolved alumina is dependent upon the amount of alumina contained in the mixture of raw materials and furthermore on the kind of cement which is intended to be manufactured from the residue.

The extraction of the alumina is regulated by sintering the material more or less strongly, which is effected either by regulating the temperature or its duration, or by working during the lixiviation with different excesses of alkali or with different concentrations. The sintering temperatures vary between about 1200 and about 1500° C., preferably temperatures of 1250–1450° C. are employed, the duration of heating varies between some minutes and some hours. There results when using one and the same raw material when sintering for instance only for 5 minutes at a temperature of 1300° C. a yield of 50% alumina; when heating at 1300° C. for one hour a yield of more than 80%; when heating at 1400° C. for 10 minutes a yield of 95%. These figures, however, differ according to the nature of the raw material. Lixiviating an increasing content of alkali in comparison with the alumina contained in the clinker involves an increase of the yield, while an increasing concentration, though involving an increase of the content of alumina in the solution, results in a decrease of the yield. When lixiviating for instance a clinker with a content of 17.5% of $Al_2O_3$ at a temperature of 60° C. with a solution of 3·6 times its quantity of a normal $Na_2CO_3$ in counter-current and with such an excess of alkali that there is provided 1 mol of $Al_2O_3$ in the clinker for 2 mols of $Na_2O$ a yield of alumina of 83% is obtained. If the same clinker is treated in the same way with the only difference that there is provided only 1.6 mols of $Na_2O$ for 1 mol of $Al_2O_3$ the yield amounts to 70%. If the clinker is lixiviated with such an excess of alkali that there is provided 1.5 mol of $Na_2O$ for 1 mol of $Al_2O_3$, the yield decreases to 62%. The lixiviation temperature lies between 0° C. and 100° C. and influences the process only in so far that when increasing the temperature the leaching is effected in a shorter time. It has been proved that the same result is realized when working for 10 minutes at a temperature of 60° C. as is obtained when working for 1 hour at 20° C.

The leaching of the clinker is preferably effected in counter-current so as to effect the lixiviation in several steps and to filter each time. The filtration proceeds in an excellent manner in contradistinction to the filtration of those residues, remaining during the alkaline decomposition of bauxite. The clinker is washed with water after having been leached for such a long time that the content of alkali is below 1.5%.

Thereupon the residue, containing about 10–20% of water is immediately calcined in a second rotary kiln at a temperature of between about 1300 and 1500° C. The clinker, after having left the kiln, does not tend to disintegrate in contradistinction to the material obtained in the first calcination treatment. It is ground to a cement, if desired, while adding material inhibiting the setting, for instance, gypsum and calcium chloride.

The aluminate solutions, obtained during the lixiviation of the clinker are worked up in the usual way to alumina, aluminium hydroxide or other aluminiferous products. The methods applied for this purpose differ in no way from those applied when working up aluminate solutions from bauxite or other sources.

By the above described working method it is possible to obtain the most different cements with a simultaneous obtaining of alkali metal aluminate. The kind of cement intended to be produced, depends on the composition of the raw-mixture as well as on the quantity of alumina dissolved. If it is desired to produce Portland cement the following proportions are to be chosen: 1 mol of $Al_2O_3$ to 1–6 mols of $SiO_2$ and 0.03–0.1 mol $Fe_2O_3$ to 1 mol of $SiO_2$ and CaO in a proportion of 1.8–2.2 mols of CaO to 1 mol of $SiO_2$ and in addition 1.8–2.2 mols of CaO to 1 mol of $Al_2O_3$ and in addition 1.8–2.2 mols of CaO to 1 mol of $Fe_2O_3$, and there is leached, according to the content of alumina of the clinker, between 40 and 80% of the alumina. From a clinker containing 17% of $Al_2O_3$, 75% of the alumina is extracted; from one containing 13%, 70% of the alumina is extracted.

In case an iron cement poor in alumina shall be manufactured, the greater part of the leachable alumina, i. e. up to about 95% of the alumina, is extracted. The iron oxide content in the calcined mixture in this case is about as follows: 0.17–0.1 mol of $Fe_2O_3$ to 1 mol of $SiO_2$.

If a Ferrari cement is intended to be manufactured, the starting mixture is composed in the same way as for the manufacture of Portland cement, but the calcined decomposition mixture is deprived of such an amount of alumina that in the leached and calcined residue the proportion of mols of $Al_2O_3$ to $Fe_2O_3$ is equal to 1:1.

Of course, by suitably varying the conditions it is possible to manufacture in this way other kinds of cements.

When working according to the described manner there are obtained cements which as to their content of $Al_2O_3$, $Fe_2O_3$, $SiO_2$ and CaO meet the requirements of the standard. Of course, the cements may also contain other components, as for instance MgO, $TiO_2$, $SO_3$, alkalies, and that in quantities which must comply with the standard.

As the residue brought into the kiln consists of components already finely divided and disintegrated to a great extent, it is far easier to manufacture a highly valuable cement from such a residue than from a mixture of raw materials such as lime, marl and clay. In contradistinction to all processes of obtaining alumina from aluminium silicates known up to date, the process in question involves the advantage of an absolute utilization of the whole material put in without any waste and that the large ballast of silicic acid is obtained directly in a relatively valuable form, i. e. as cement. This does not only save a lot of operations which would have been unavoidable if the residue was supplied as an additional agent to the cement-works but increases at the same time the economy of a process of manufacturing alumina combined with the manufacture of cement.

In contradistinction to the processes of obtaining alumina from aluminium silicates by means of an acid, the process of this application involves the advantage of making it possible to work up various raw materials, while when working according to the acid process the working up is restricted to clays rich in kaolin. According to my invention also slate clays, ashes, slags rich in alumina can be worked up. It is of special advantage to use raw materials containing already a substantial part of the lime requisite as additional agent, as for instance slags or iron and alkali-containing materials, since the loss of alkali, arising when washing out the clinker, can be compensated entirely or partly by the content of alkali in the raw material.

*Example 1*

100 parts by weight of a clay of the following composition: 45.1% of $SiO_2$, 37.5% of $Al_2O_3$, 1.5% of $Fe_2O_3$ and with 14.6% loss on ignition are mixed with 225 parts of limestone and 4.2 parts of iron oxide (in the form of roasted pyrites). The whole raw materials are subjected to such a fine grinding that the residue remaining on a sieve with 4900 meshes per $cm^2$ is between 5 and 10%.

The mixture is formed to granules and calcined in a rotary kiln at 1350° C. for about 10 minutes. When leaving the kiln the clinker shows the following composition: 20.8% of $SiO_2$, 17.2% of $Al_2O_3$, 2.6% of $Fe_2O_3$, 58.0% of CaO. On air-cooling it disintegrates spontaneously into dust-like powder. This powder is leached in counter-current with 3.6 times its quantity of normal sodium carbonate solution at 60° C. The quantity of the solution is calculated in that way that 1 mol of $Al_2O_3$ in the clinker corresponds to 1.6 mols of $Na_2O$ in the solution. Such a further amount of solution is added and is retained by the filter cake when filtering off, i. e. for 100 grams of clinker about 100 ccms of the solution. Under these circumstances 75% of the alumina of the clinker are dissolved. The alumnate solution is worked up in the usual manner. The residue is washed with water and calcined in a second rotary kiln at temperatures between about 1350 and about 1450° C. A cement clinker of the following composition is formed: 23.6% of $SiO_2$, 4.9% of $Al_2O_3$, 3.0% of $Fe_2O_3$, 66.0% of CaO, 0.8% of alkali, which while adding 3% of gypsum is ground to the fineness of cement. The Portland cement obtained was examined according to the standard and showed the following hardness:

| | | | After— | |
|---|---|---|---|---|
| | 3 days | 7 days | 28 days | |
| | | | Water | Comb. storage |
| Compressive strength in kgs. per $cm^2$ | 210 | 305 | 493 | 503 |
| Tensile strength in kgs. per $cm^2$ | 24.2 | 30.5 | 39.3 | 39.8 |

*Example 2*

100 parts by weight of coal-bearing shale, obtained as by-product when washing coals, of the following composition: 36.1% of $SiO_2$, 0.7% of $TiO_2$, 22.0% of $Al_2O_3$, 3.7% of $Fe_2O_3$, 1.6% of CaO, 1.3% of MgO, 4.7% of alkalies and with 29.8% loss on ignition are mixed with 177 parts of limestone and 1.7 parts of iron oxide (roasted pyrites). The degree of fineness of grinding should be such that the residue on a sieve with 4900 meshes per $cm^2$ only amounts to 5–10%.

The mixture is granulated and sintered in a rotary kiln at a temperature of 1350° C. remaining only during about 10 minutes in the hot part of the kiln. On leaving the kiln the clinker shows the composition of 21.1% of $SiO_2$, 0.4% of $TiO_2$, 12.9% of $Al_2O_3$, 3.2% of $Fe_2O_3$, 58.8% of CaO, 0.8% of MgO, 1.7% of alkalies. On air-cooling it disintegrates spontaneously to a dust-like powder. This powder is mixed with 3.6 times its quantity of normal sodium carbonate solution at 60° C. The quantity of the solution is chosen in such a proportion that there is provided 1.6 mol of $Na_2O$ in the solution for 1 mol of $Al_2O_3$ in the clinker. The clinker is washed with hot water. Under these circumstances 70% of the alumina of the clinker is dissolved.

When the solutions are further worked up to alumina, the washed residue is sintered in another rotary kiln at temperatures between about 1350 and 1450° C. There results a cement clinker of the following composition: 23.4% of $SiO_2$, 0.4% of $TiO_2$, 4.3% of $Al_2O_3$, 3.6% of $Fe_2O_3$, 65.5% of CaO, 0.8% of MgO, 1.0% of alkali, which is ground together with 3% of gypsum to the fineness of cement. The Portland cement thus obtained shows a similar resistance to pressure and tenacity as the cement manufactured according to Example 1.

*Example 3*

100 parts by weight of clay of the composition: 45.1% of $SiO_2$, 37.5% of $Al_2O_3$, 1.5% of $Fe_2O_3$, and 14.6% loss on ignition are mixed with 275 parts of limestone, 12.0 parts of iron oxide (roasted pyrites) and 23.4 parts of bauxite of the composition: 5.1% of $SiO_2$, 57.6% of $Al_2O_3$, 21.8% of $Fe_2O_3$, 0.9% of $TiO_2$. The degree of fineness of grinding is such that the residue on a sieve with 4900 meshes per $cm^2$ amounts to 5–10%. The mixture is calcined in a rotary kiln at a temperature of about 1300° C. for about 10 minutes. The sintered material shows the composition: 17.0% of $SiO_2$, 0.2% of $TiO_2$, 18.7% of $Al_2O_3$, 6.8% of $Fe_2O_3$, 56.5% of CaO and is lixiviated in the same way as described in Example 1, which results in an amount of lixiviation of 78% of the alumina present. The residue is calcined to cement in another rotary kiln at a temperature between 1350 and 1450° C. The cement obtained has the composition: 19.9% of $SiO_2$, 0.2% of $TiO_2$, 4.9% of $Al_2O_3$, 8.0% of $Fe_2O_3$, 66.1% of CaO and is equal to the so-called "Ferrari"-cement, which is distinguished over the Portland cements by a greater resistance towards seawater.

I claim:

1. Process of preparing cement and alkali metal aluminate which comprises mixing a material containing aluminium oxide and silicon dioxide in a proportion of 1 mol of $Al_2O_3$ to about 0.6 to 6 mols of $SiO_2$ with a calcium compound yielding calcium oxide during calcination, whereby the mixture to be calcined is composed in such a proportion that there are present 1.8–2.2 mols of CaO to 1 mol of $Al_2O_3$ and in addition 1.8–2.2 mols of CaO to 1 mol of $SiO_2$, heating the finely divided mixture to sintering temperature, lixiviating the calcined product by means of an aqueous solution of an alkali metal salt which yields by double decomposition a difficultly soluble calcium compound, separating the alkali metal aluminate solution obtained from the solid residue, washing the residue by means of water, heating the washed solid residue to sintering temperature and grinding to cement fineness.

2. Process of preparing cement and alkali metal aluminate which comprises mixing a material containing aluminium oxide, silicon dioxide and iron oxide in a proportion of 1 mol of $Al_2O_3$ to about 0.6 to 6 mols of $SiO_2$, a trace to about 0.3 mol of $Fe_2O_3$ to 1 mol of $SiO_2$ with a calcium compound yielding calcium oxide during calcination, whereby the mixture to be calcined is composed in such a proportion that there are present 1.8–2.2 mols of CaO to 1 mol of $Al_2O_3$ and in addition 1.8–2.2 mols of CaO to 1 mol of $SiO_2$ and in addition 1.8–2.2 mols of CaO to 1 mol of $Fe_2O_3$, heating the finely divided mixture to sintering temperature, lixiviating the calcined product by means of an aqueous solution of an alkali metal salt which yields by double decomposition a difficultly soluble calcium compound, separating the alkali metal aluminate solution obtained from the solid residue, washing the residue by means of water, heating the washed solid residue to sintering temperature and grinding to cement fineness.

3. Process of preparing cement and alkali metal aluminate which comprises mixing a material containing aluminium oxide and silicon dioxide in a proportion of 1 mol of $Al_2O_3$ to about 0.6 to 6 mols of $SiO_2$ with a calcium compound yielding calcium oxide during calcination, whereby the mixture to be calcined is composed in such a proportion that there are present 1.8–2.2 mols of CaO to 1 mol of $Al_2O_3$ and in addition 1.8–2.2 mols of CaO to 1 mol of $SiO_2$, heating the finely divided mixture to sintering temperature, lixiviating the calcined product by means of an aqueous solution of an alkali metal salt which yields by double decomposition a difficultly soluble calcium compound, said solution containing at least one mol of alkali metal compound on one mol of aluminium oxide in the sintered product and which solution has a concentration of about 1–4 times of normal alkali, transforming thereby about 40–95% of the alumina present into aluminate, separating the alkali metal aluminate solution obtained from the solid residue, washing the residue by means of water, heating the washed solid residue to sintering temperature and grinding to cement fineness.

4. Process of preparing cement and alkali metal aluminate which comprises mixing a material containing aluminium oxide, silicon dioxide and iron oxide in a proportion of 1 mol of $Al_2O_3$ to about 0.6 to 6 mols of $SiO_2$, a trace to about 0.3 mol of $Fe_2O_3$ to 1 mol of $SiO_2$ with a calcium compound yielding calcium oxide during calcination, whereby the mixture to be calcined is composed in such a proportion that there are present 1.8–2.2 mols of CaO to 1 mol of $Al_2O_3$ and in addition 1.8–2.2 mols of CaO to 1 mol of $SiO_2$ and in addition 1.8–2.2 mols of CaO to 1 mol of $Fe_2O_3$, heating the finely divided mixture to sintering temperature, lixiviating the calcined product by means of an aqueous solution of an alkali metal salt which yields by double decomposition a difficultly soluble calcium compound, said solution containing at least one mol of alkali metal compound on one mol of aluminium oxide in the sintered product and which solution has a concentration of about 1–4 times of normal alkali, transforming thereby about 40–95% of the alumina present into aluminate, separating the alkali metal aluminate solution obtained from the solid residue, washing the residue by means of water, heating the washed solid residue to sintering temperature and grinding to cement fineness.

5. Process of preparing cement and alkali metal aluminate which comprises mixing a material containing aluminium oxide and silicon dioxide in a proportion of 1 mol of $Al_2O_3$ to about 0.6 to 6 mols of $SiO_2$ with a calcium compound yielding calcium oxide during calcination, whereby the mixture to be calcined is composed in such a proportion that there are present 1.8–2.2 mols of CaO to 1 mol of $Al_2O_3$ and in addition 1.8–2.2 mols of CaO to 1 mol of $SiO_2$, heating the finely divided mixture to a temperature of 1250–1450° C., lixiviating the calcined product by means of an aqueous solution of an alkali metal salt which yields by double decomposition a difficultly soluble calcium compound, separating the alkali metal aluminate solution obtained from the solid residue, washing the residue by means of water, heating the washed solid residue to a temperature of 1300–1500° C. and grinding to cement fineness.

6. Process of preparing cement and alkali metal aluminate which comprises mixing a material containing aluminium oxide, silicon dioxide and iron oxide in a proportion of 1 mol of $Al_2O_3$ to about 0.6–6 mols of $SiO_2$, a trace to about 0.3 mol of $Fe_2O_3$ to 1 mol of $SiO_2$ with a calcium compound yielding calcium oxide during calcination, whereby the mixture to be calcined is composed in such a proportion that there are present 1.8–2.2 mols of CaO to 1 mol of $Al_2O_3$ and in addition 1.8–2.2 mols of CaO to 1 mol of $SiO_2$, and in addition 1.8–2.2 mols of CaO to 1 mol of $Fe_2O_3$, heating the finely divided mixture to a temperature of 1250–1450° C., lixiviating the calcined product by means of an aqueous solution of an alkali metal salt which yields by double decomposition a difficultly soluble calcium compound, separating the alkali metal aluminate solution obtained from the solid residue, washing the residue by means of water, heating the washed solid residue to a temperature of 1300–1500° C. and grinding to cement fineness.

7. Process of preparing cement and alkali metal aluminate which comprises mixing a material containing aluminium oxide and silicon dioxide in a proportion of 1 mol of $Al_2O_3$ to about 0.6 to 6 mols of $SiO_2$ with a calcium compound yielding calcium oxide during calcination, whereby the mixture to be calcined is composed in such a proportion that there are present 1.8–2.2 mols of CaO to 1 mol of $Al_2O_3$ and in addition 1.8–2.2 mols of CaO to 1 mol of $SiO_2$, heating the finely divided mixture to a temperature of 1250–1450° C., lixiviating the calcined product by means of an aqueous solution of an alkali metal salt which yields by double decomposition a difficultly soluble calcium compound, said solution containing at least one mol of alkali metal compound on one mol of aluminium oxide in the sintered product and which solution has a concentration of about 1–4 times of normal alkali, transforming thereby about 40–95% of the alumina present into aluminate, separating the alkali metal aluminate solution obtained from the solid residue, washing the residue by means of water, heating the washed solid residue to a temperature of 1300–1500° C. and grinding to cement fineness.

8. Process of preparing cement and alkali metal aluminate which comprises mixing a material containing aluminium oxide, silicon dioxide and iron oxide in a proportion of 1 mol of $Al_2O_3$ to about 0.6 to 6 mols of $SiO_2$, a trace to about 0.3 mol of $Fe_2O_3$ to 1 mol of $SiO_2$ with a calcium compound yielding calcium oxide during calcination, whereby the mixture to be calcined is composed in such a proportion that there are present 1.8–2.2 mols of CaO to 1 mol of $Al_2O_3$ and in addition 1.8–2.2 mols of CaO to 1 mol of $SiO_2$ and in addition 1.8–2.2 mols of CaO to 1 mol of $Fe_2O_3$, heating the finely divided mixture to a temperature of 1250–1450° C., lixiviating the calcined product by means of an aqueous solution of an alkali metal salt which yields by double decomposition a difficultly soluble calcium compound, said solution containing at least one mol of alkali metal compound on one mol of aluminium oxide in the sintered product, and which solution has a concentration of about 1–4 times of normal alkali, transforming thereby about 40–95% of the alumina present into aluminate, separating the alkali metal aluminate solution obtained from the solid residue, washing the residue by means of water, heating the washed solid residue to a temperature of 1300–1500° C. and grinding to cement fineness.

9. Process of preparing Portland cement and alkali metal aluminate which comprises mixing a material containing aluminium oxide, silicon dioxide and iron oxide in a proportion of 1 mol of $Al_2O_3$ to about 2 mols of $SiO_2$, 0.03–0.1 mol of $Fe_2O_3$ to 1 mol of $SiO_2$ with a calcium compound yielding calcium oxide during calcination, whereby the mixture to be calcined is composed in such a proportion that there are present 2 mols of CaO to 1 mol of $Al_2O_3$ and in addition 2 mols of CaO to 1 mol of $SiO_2$ and in addition 2 mols of CaO to 1 mol of $Fe_2O_3$, heating the finely divided mixture to a temperature of 1250–1450° C., lixiviating the calcined product by means of an aqueous solution of an alkali metal salt which yields by double decomposition a difficultly soluble calcium compound, said solution containing at least one mol of alkali metal compound on one mol of aluminium oxide in the sintered product, and which solution has a concentration of about 1–4 times of normal alkali, transforming thereby about 70–80% of the alumina present into aluminate, separating the alkali metal aluminate solution obtained from the solid residue, washing the residue by means of water, heating the washed solid residue to a temperature of 1300–1500° C. and grinding to cement fineness.

10. Process of preparing Portland cement and alkali metal aluminate which comprises mixing a material containing aluminium oxide, silicon dioxide and iron oxide in a proportion of 1 mol of $Al_2O_3$ to about 3 mols of $SiO_2$, 0.06 mol of $Fe_2O_3$ to 1 mol of $SiO_2$ with a calcium compound yielding calcium oxide during calcination, whereby the mixture to be calcined is composed in such a proportion that there are present 2.1 mols of CaO to 1 mol of $Al_2O_3$ and in addition 2.1 mols of CaO to 1 mol of $SiO_2$ and in addition 2.1 mols of CaO to 1 mol of $Fe_2O_3$, heating the finely divided mixture to a temperature of 1250–1450° C., lixiviating the calcined product by means of an aqueous solution of an alkali metal salt which yields by double decomposition a difficultly soluble calcium compound, said solution containing at least one mol of alkali metal compound on one mol of aluminium oxide in the sintered product, and which solution has a concentration of about 1–4 times of normal alkali, transforming thereby about 65–75% of the alumina present into aluminate, separating the alkali metal aluminate solution obtained from the solid residue, washing the residue by means of water, heating the washed solid residue to a temperature of 1300–1500° C. and grinding to cement fineness.

11. Process of preparing Ferrari cement and alkali metal aluminate which comprises mixing a material containing aluminium oxide, silicon dioxide and iron oxide in a proportion of 1 mol of $Al_2O_3$ to about 1.5 mols of $SiO_2$, 0.15 mol of $Fe_2O_3$ to 1 mol of $SiO_2$, with a calcium compound yielding calcium oxide during calcination, whereby the mixture to be calcined is composed in such a proportion that there are present 2 mols of CaO to 1 mol of $Al_2O_3$ and in addition 2 mols of CaO to 1 mol of $SiO_2$ and in addition 2 mols of CaO to 1 mol of $Fe_2O_3$, heating the finely divided mixture to a temperature of 1250–1450° C., lixiviating the calcined product by means of an aqueous solution of an alkali metal salt which yields by double decomposition a difficultly soluble calcium compound, said solution containing at least one mol of alkali metal compound on one mol of aluminium oxide in the sintered product, and which solution has a concentration of about 1–4 times of normal alkali, transforming thereby about 75–80% of the alumina present into aluminate, separating the alkali metal aluminate solution obtained from the solid residue, washing the residue by means of water, heating the washed solid residue to a temperature of 1300–1500° C. and grinding to cement fineness.

WALTER NOLL.